(12) United States Patent
Li

(10) Patent No.: US 7,175,291 B1
(45) Date of Patent: Feb. 13, 2007

(54) AUTOMOBILE REARVIEW MIRROR WITH LCD DISPLAY

(76) Inventor: Shin-Nan Li, 235 Chung-Ho Box 8-24, Taipei (TW)

(*) Notice: Subject to any disclaimer, the term of this patent is extended or adjusted under 35 U.S.C. 154(b) by 0 days.

(21) Appl. No.: 11/495,702

(22) Filed: Jul. 31, 2006

(51) Int. Cl.
G02B 7/182 (2006.01)
G02B 5/08 (2006.01)
B60R 1/04 (2006.01)
B60R 1/08 (2006.01)

(52) U.S. Cl. .................. 359/871; 359/844; 359/838
(58) Field of Classification Search ................ 359/838, 359/844, 871, 872; 348/118, 148, 552; 340/438, 340/461, 462, 905, 937
See application file for complete search history.

(56) References Cited

U.S. PATENT DOCUMENTS

| | | | | |
|---|---|---|---|---|
| 4,625,210 A * | 11/1986 | Sagl | ............................. | 342/20 |
| 4,983,951 A * | 1/1991 | Igarashi et al. | ............. | 340/461 |
| 5,432,496 A * | 7/1995 | Lin | ............................. | 340/468 |
| 5,642,238 A * | 6/1997 | Sala | ............................. | 359/871 |
| 5,940,120 A * | 8/1999 | Frankhouse et al. | .......... | 348/61 |
| 6,412,959 B1 * | 7/2002 | Tseng | ............................. | 359/839 |
| 6,428,172 B1 * | 8/2002 | Hutzel et al. | ................ | 359/838 |
| 6,545,598 B1 * | 4/2003 | de Villeroche | .............. | 340/438 |
| 6,889,064 B2 * | 5/2005 | Baratono et al. | ......... | 455/569.2 |
| 6,902,284 B2 * | 6/2005 | Hutzel et al. | ................ | 359/865 |
| 2002/0154007 A1 * | 10/2002 | Yang | ........................... | 340/456 |
| 2006/0076860 A1 * | 4/2006 | Hoss | ........................... | 312/312 |
| 2006/0164230 A1 * | 7/2006 | DeWind et al. | ............. | 340/461 |

FOREIGN PATENT DOCUMENTS

| | | | |
|---|---|---|---|
| DE | 19934999 A1 * | 2/2001 | |
| DE | 20118868 U1 * | 1/2002 | |
| DE | 10131459 A1 * | 1/2003 | |
| JP | 63-2753 * | 1/1988 | |
| JP | 08-216789 * | 8/1996 | |
| JP | 2004-182156 * | 7/2004 | |

* cited by examiner

Primary Examiner—Ricky D. Shafer

(57) ABSTRACT

An automobile rearview mirror with an LCD display comprises a front panel, a mount, a display unit housed between the front panel and the mount, a front frame, a rear shell, and a mirror. The display unit, the front panel, the mount and the mirror are contained between the rear shell and the mirror. The automobile rearview mirror thereby assembled can be installed at the location of a rearview mirror in an automobile. There are two springs disposed between the mount and the rear shell that provide the force needed to pull down the front panel and the display monitor. The slide motion is further assisted by rail sectors, corresponding slide elements, gear sectors and oil-pressure gear wheels. The automobile rearview mirror is further provided with locking pieces and releases for properly retained the position of the display unit.

5 Claims, 10 Drawing Sheets

AUTOMOBILE REARVIEW MIRROR WITH LCD DISPLAY

FIELD OF THE INVENTION

The present invention relates to automobile rearview mirrors, more particularly to an automobile rearview mirror with a liquid crystal display (LCD display) light emitting diode (LED display), which LCD display can be pulled down smoothly from the rearview mirror when activated by a touch-sensitive switch, without disturbing the position of the rearview mirror.

BACKGROUND OF THE INVENTION

An automobile rearview mirror with a display unit of the prior art has the function of displaying received information such as satellite guidance, movies and other multimedia. However, the traditional light emitting diode (LED display) unit needs a window shield in front of its screen for protection, which is easy to get contaminated or to distort the images displayed. Accordingly, an improved rearview mirror display of the prior art uses a LED display unit that can be rotated on the back side of the mirror and can be rotated back to the front side of the mirror for viewing. In another improved invention, an ejection device is installed on the back side of the rearview mirror so that the display unit can be locked and ejected out of the mirror for display.

However, those improved rearview mirror displays need to be ejected or folded out by manual operation, which is not easy to operate and may causes unwanted shaking of the mirror. Further, the car movement may cause vibrations of the display as it is ejected.

SUMMARY OF THE INVENTION

The primary objective of the present invention is to provide an automobile rearview mirror with an LCD display comprising a front panel, a mount, a display unit housed between the front panel and the mount, a front frame, a rear shell, and a mirror. The display unit, the front panel, the mount and the mirror are contained between the rear shell and the mirror. The automobile rearview mirror thereby assembled can be installed at the location of a rearview mirror in an automobile. There are two springs disposed between the mount and the rear shell that provide the force needed to pull down the front panel and the display monitor. The slide motion is further assisted by rail sectors, corresponding slide elements, gear sectors and oil-pressure gear wheels. The automobile rearview mirror is further provided with locking pieces and releases for properly retained the position of the display unit Accordingly, the automobile rearview mirror with an LCD display utilized a pair of springs installed between the mount and the rear shell for energy storage when the display unit is retracted therein. The present invention further uses a plurality of rail sectors and slide elements between the mount and the rear shell for assuring a smooth slide of the mount. Further, there are gear sectors and oil-pressure gear wheels between the mount and the rear shell to drive a steady shift of the mount. There are locking pieces and release units between the mount and the rear shell for retaining the mount in the cavity of the rearview mirror body.

The various objects and advantages of the present invention will be more readily understood from the following detailed description when read in conjunction with the appended drawings.

DETAILED DESCRIPTION OF THE PREFERRED EMBODIMENTS

Figure 1:
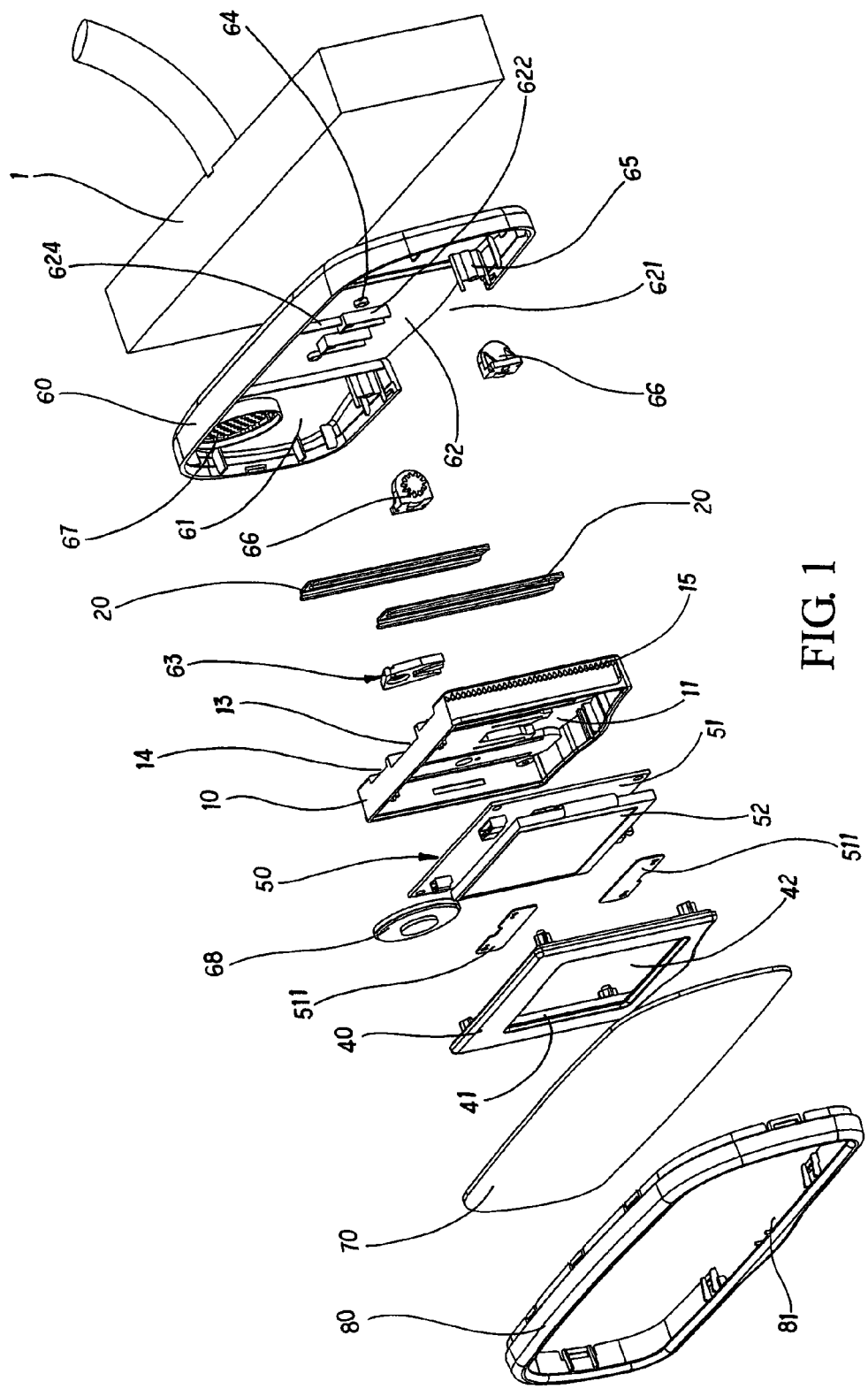
FIG. 1 is an exploded perspective view of an automobile rearview mirror of the present invention.
Figure 2:
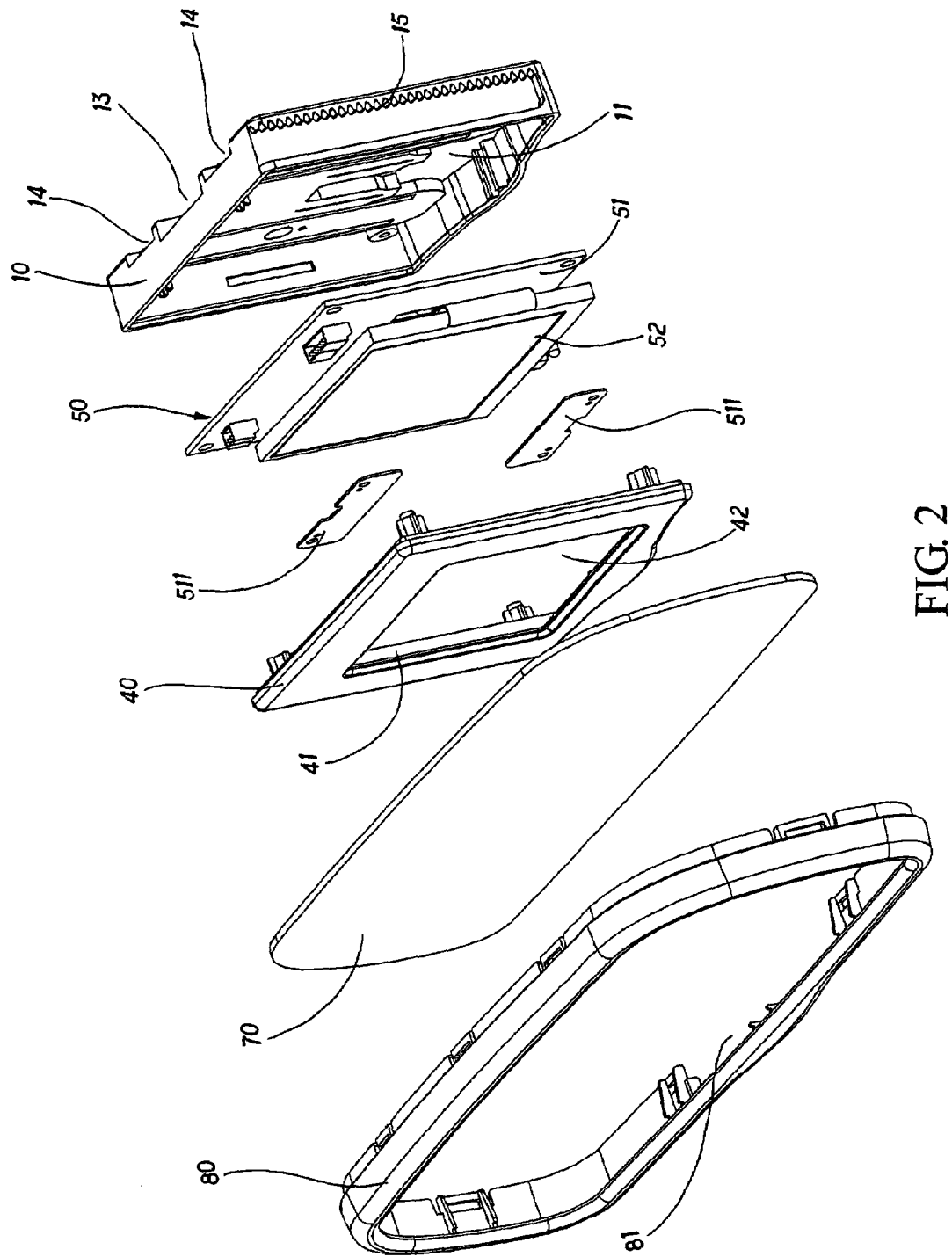
FIG. 2 is an exploded perspective view of the front half of the automobile rearview mirror in FIG. 1.

Referring to FIGS. 1 and 2, the first preferred embodiment of the present invention as an automobile rearview mirror with an LCD display is installed at the front seat wind shield of an automobile. The automobile rearview mirror 1 comprises a mount 10, two rail sectors 20, two springs 30, a front panel 40, a display unit 50, a rear shell 60, a mirror 70 and a front frame 80.

Figure 3:
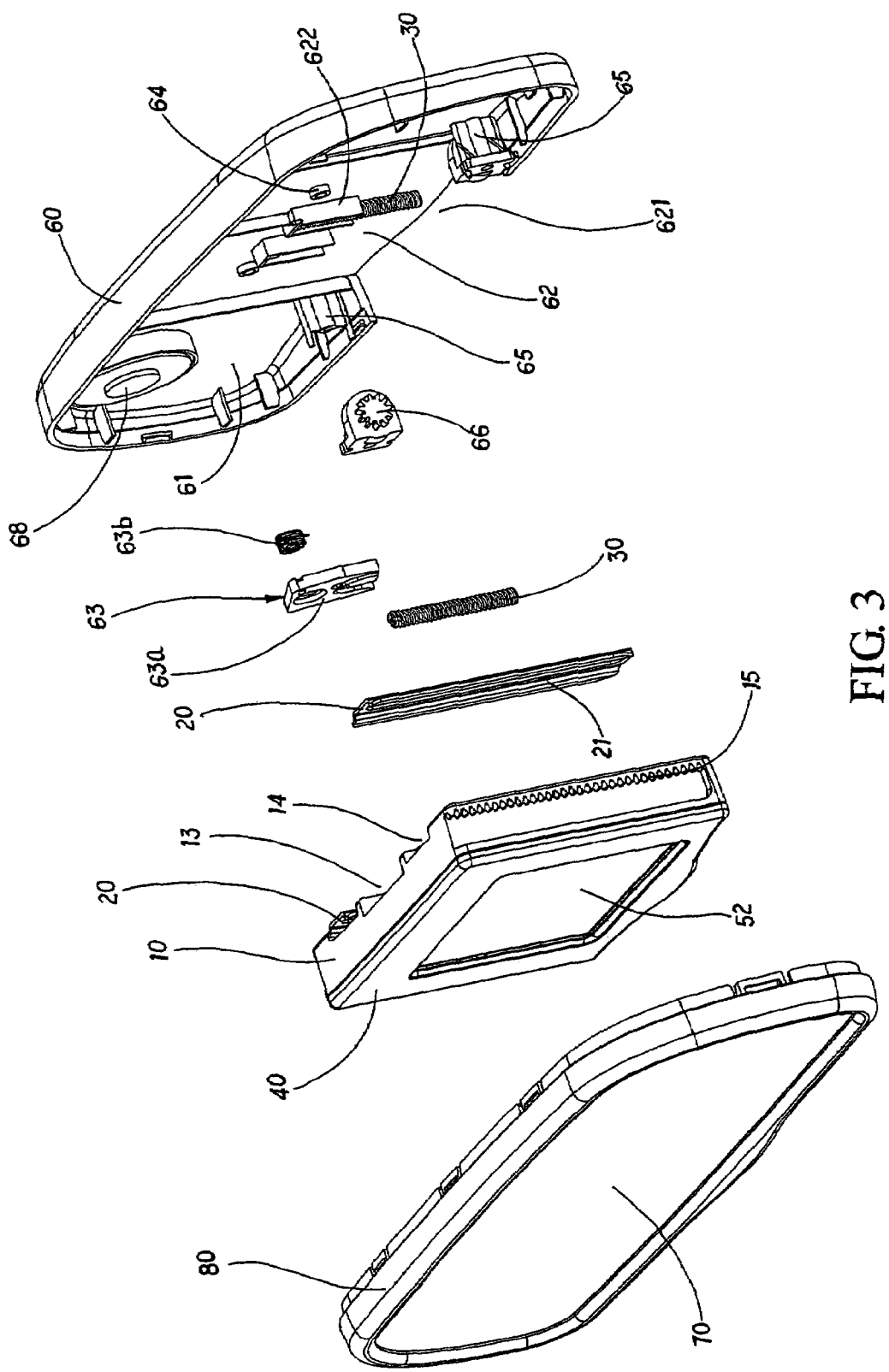
FIG. 3 is an exploded perspective view of the rear half of the automobile rearview mirror in FIG. 1.
Figure 4:
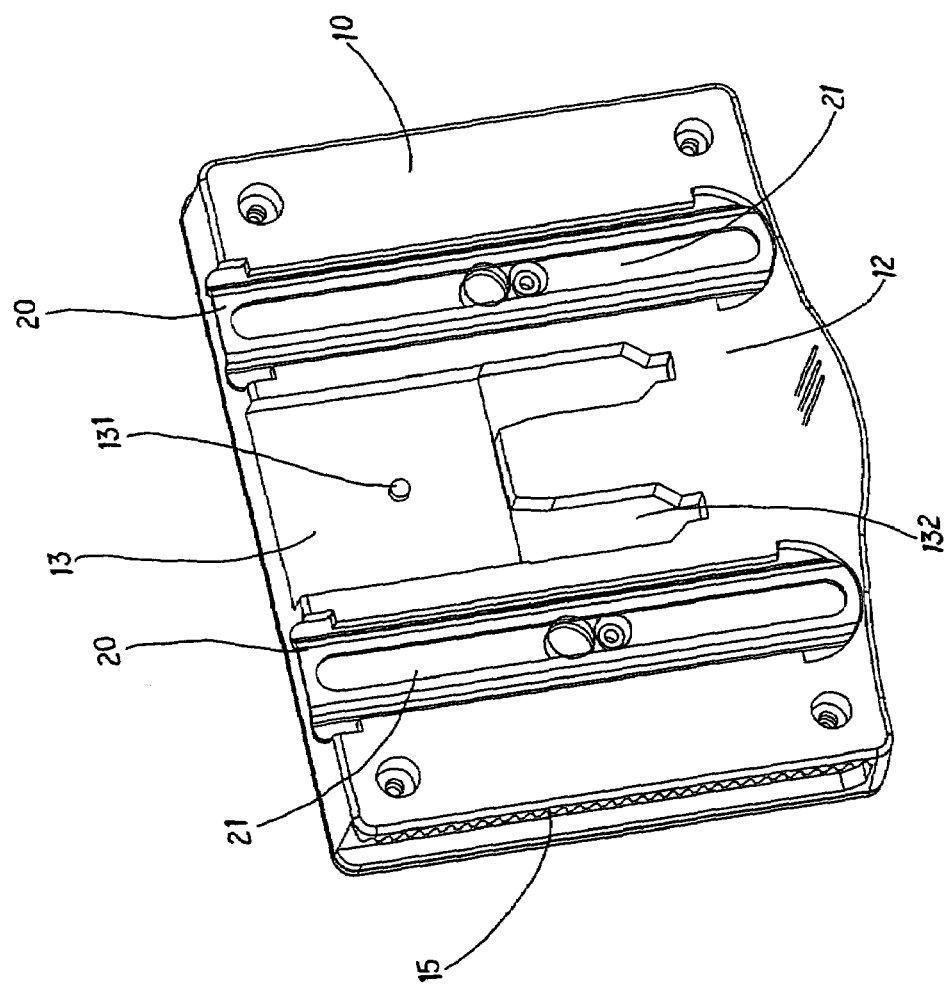
FIG. 4 is a perspective view of the mount of the automobile rearview mirror in FIG. 1.
Figure 5:
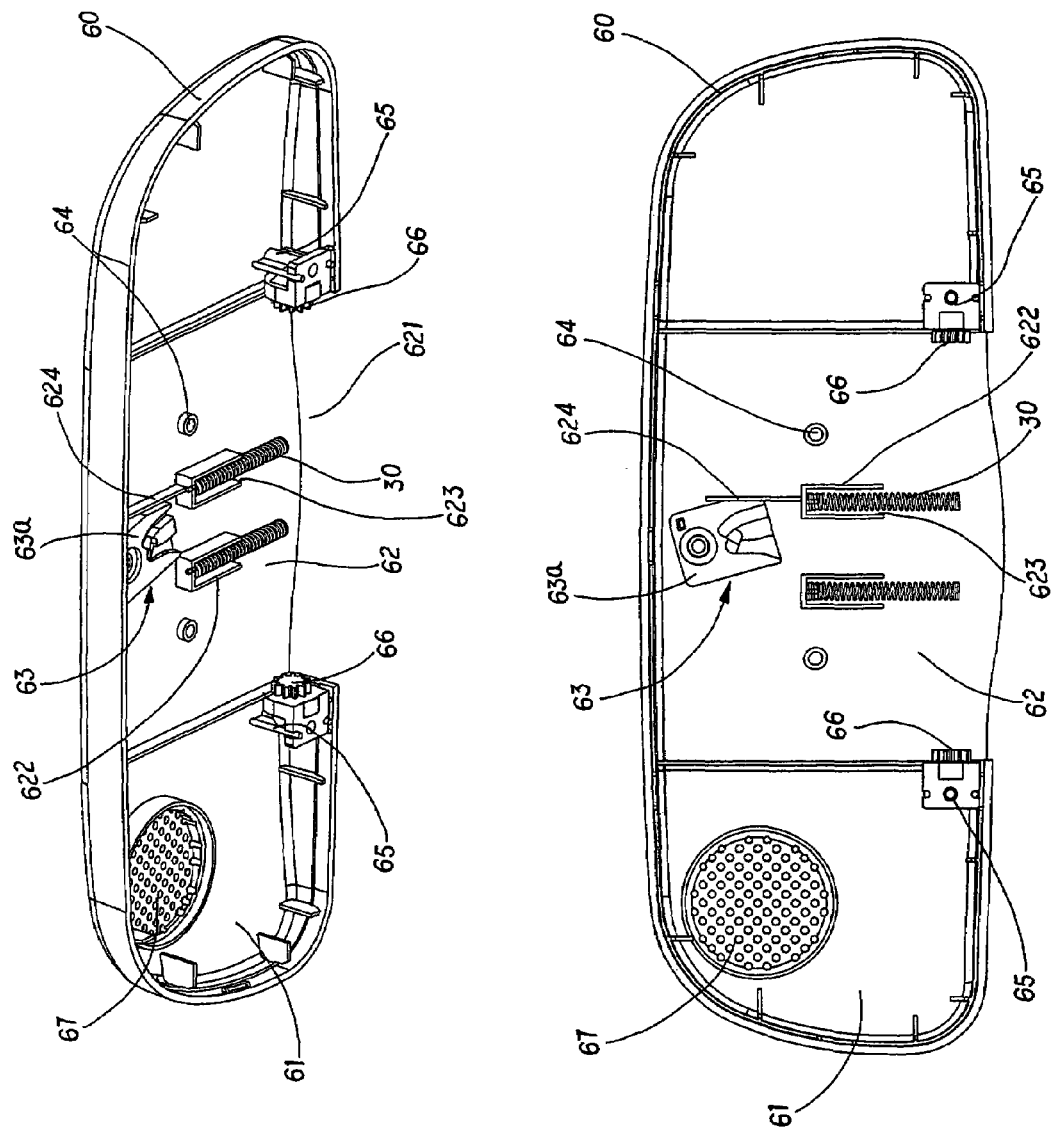
FIG. 5 displays a perspective view and a front view of the automobile rearview mirror in FIG. 1.

Referring to FIGS. 3 to 5, the mount 10 further includes a recessed front wall 11 and a rear wall 12 having a central receptacle 13. A cylindrical release 131 is extended from an upper edge of the receptacle 13; two spring slots 132 are respectively formed on two lateral sides of the receptacle 13. Further, on the rear wall 12 at locations corresponding to two lateral sides of the receptacle 13, there are two rail slots 14. The lateral sides of the rear wall 12 are respectively provided with gear sectors 15.

Each of the rail sectors 20 has a slide groove 21 for being engaged with the rail slots 14 on the mount 10.

Each of the springs 30 is housed in the receptacle 13 within the rear wall 12 of the mount 10. Each of the springs 30 has a bottom end supported against by a corresponding spring slot 132, whereby the restoring spring force will drive the downward motion of the mount 10.

The front panel 40 is locked in front of the mount 10, which defines a retaining cavity 41 with the recessed front wall 11. The central part of the front panel 40 forms an opening 42.

The display unit 50 is housed within the retaining cavity 41 between the mount 10 and the front panel 40. The display unit 50 comprises a base board 51 with a circuit board 511 thereon and an LCD screen 52 mounted on the front side of the base board 51, whereby the LCD screen 52 can be see through the opening 42 on the front panel 40.

Figure 10:
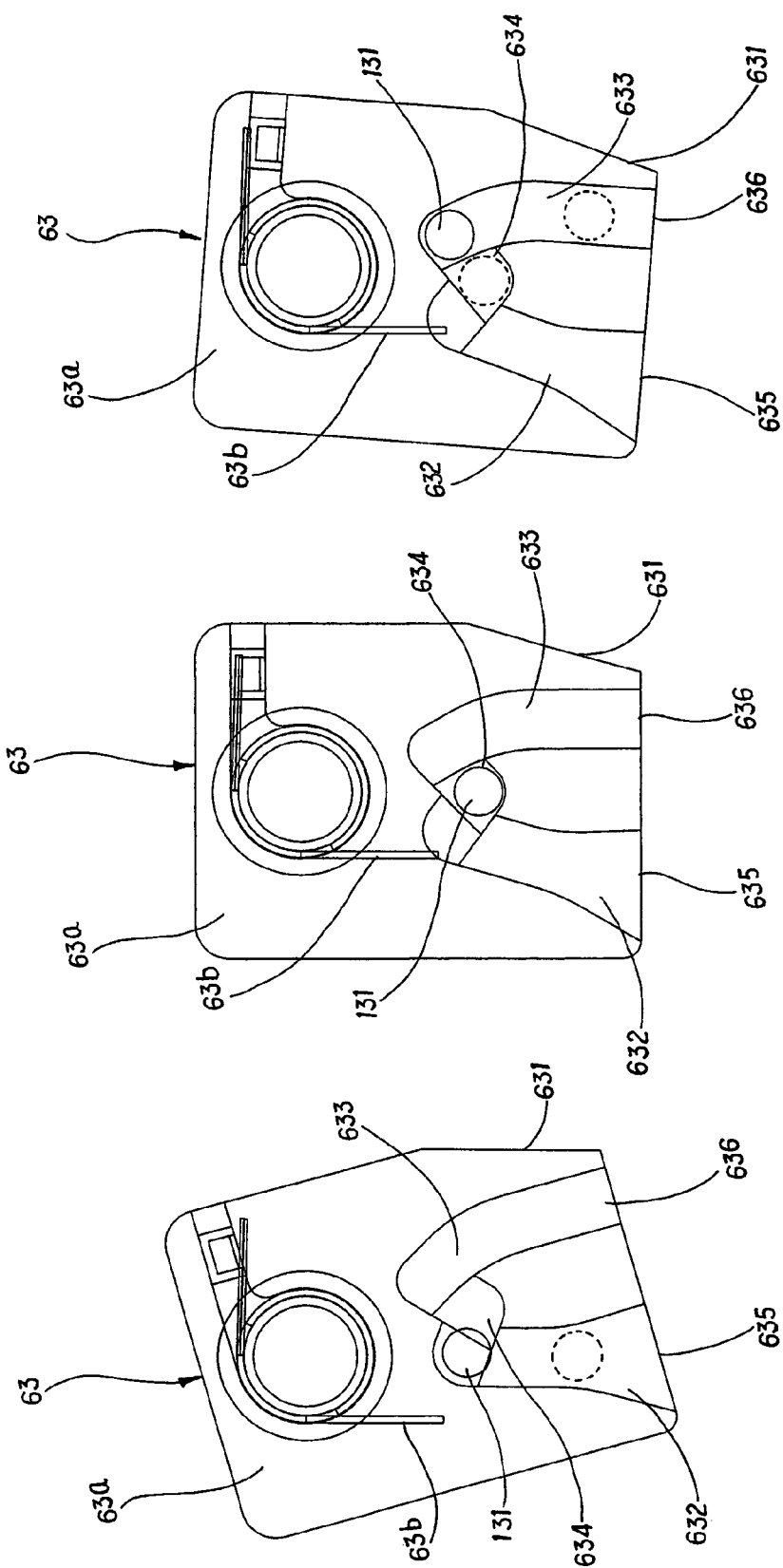
FIG. 10 shows the locking device of the present invention in various configurations.

The rear shell 60, located behind the mount 10, has a front wall 61 with a central receptacle 62 for housing the mount 10. The bottom side of the receptacle 62 has an opening 621 for pulling out the mount 10. Two lateral sides of the receptacle 62 are each provided with an invert U-shaped frame slots 622, together with the inner wall of the receptacle 62 forming two spring retaining slots 623, wherein two springs 30 are supported against the top ends of the spring retaining slots 623. Further, the front wall 61 has a stop wall 624 extended along the upper edge of the right one of the frame slots 622, the right side of the stop wall 624 is coupled with a locking piece 63, as shown in FIG. 10. The locking piece 63 further includes a main body 63*a* and a torsional spring 63*b*. The main body 63*a* is pivotally connected to the front wall 61, whereby the torsional spring 63*b* is mounted between the main body 63*a* and the front wall 61, and whereby the main body 63*a* driven by the torsional spring 63*b* will tilt toward a predetermined direction. Therefore, a right sloppy wall 631 will lean against the front wall 61. Secondly, the main body 63*a* is provided with an inward guiding channel 632 having a non-uniform depth, an outward guiding channel 633 and a locking slot 634 with two ends respectively connected to the inward guiding channel 632 and the outward guiding channel 633. The inward guiding channel 632 has an entrance 635 at the bottom edge of the main body 63*a*. The outward guiding channel 633 has an exit 636 also at the bottom edge of the main body 63*a*. Thereby, the release 131 on the rear wall 12 enters the inward guiding channel 632 through the entrance 635 as the mount 10 is shifting upward, till the mount is locked in the locking slot 634. When the mount 10 is again pushed to the apex of the inward guiding channel 632 the release 131 will leave the locking slot 634 and enter the outward guiding channel 633. The mount 10 will then be ejected along the outward guiding channel 633 by the springs 30, and the release 131 eventually leaves the outward guiding channel 633 through the exit 636. Further, the front wall 61 has two slide elements 64 respectively installed on the outer sides of the frame slots 622. In this preferred embodiment, the slide elements 64 are pulleys that slide along the slide grooves 21 of the rail sectors 20. The receptacle 62 of the front wall 61 has two retaining seats 65 mounted on the bottom ends of its two lateral sides. There are oil-pressure gear wheels 66 respectively installed on the retaining seats 65, whereby they can be engaged with the gear sectors 15 on the mount 10, providing the slide motion of the mounted with suitable damping effect when it is going down. Further, one side of the rear shell 60 is provided with a mesh 67 and a speaker 68.

The mirror 70 is located in the front of the front panel for providing usual functions of a mirror.

The front frame 80 and the rear shell 60 are so coupled that the mirror 70, the front panel 50 and the mount 10 are confined between the front frame 80 and the rear shell 60. The central part of the bottom side of the front frame 80 is provided with an opening 81 corresponding to the opening 621 of the rear shell 62, whereby the combined structure of the mount 10, the display unit 50 and the front panel 40 can go through the main body of the rearview mirror.

To use the present invention, please refer to the following process.

Figure 6:
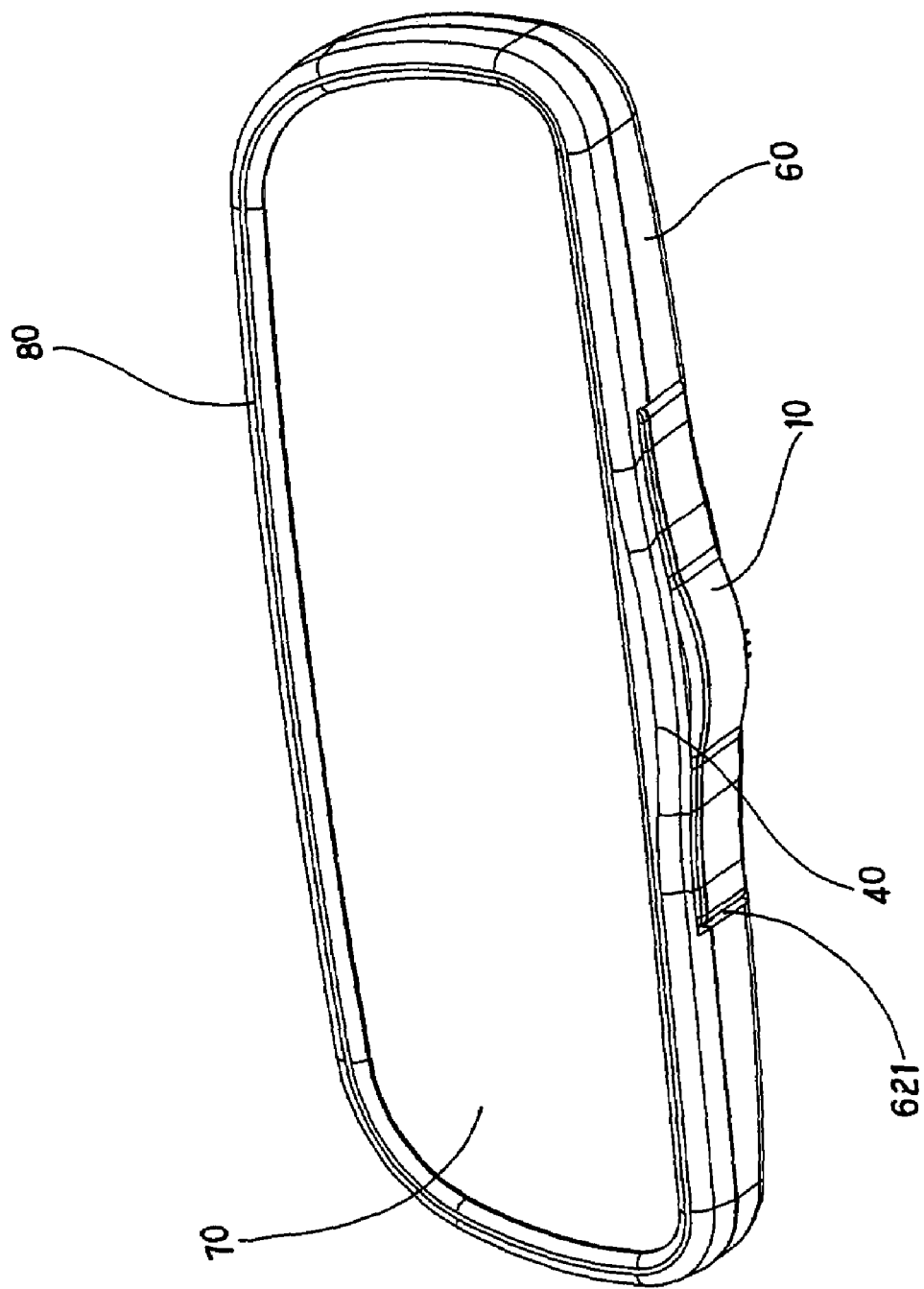
FIG. 6 is a perspective view of the automobile rearview mirror in FIG. 1 wherein the display unit is hidden.
Figure 7:
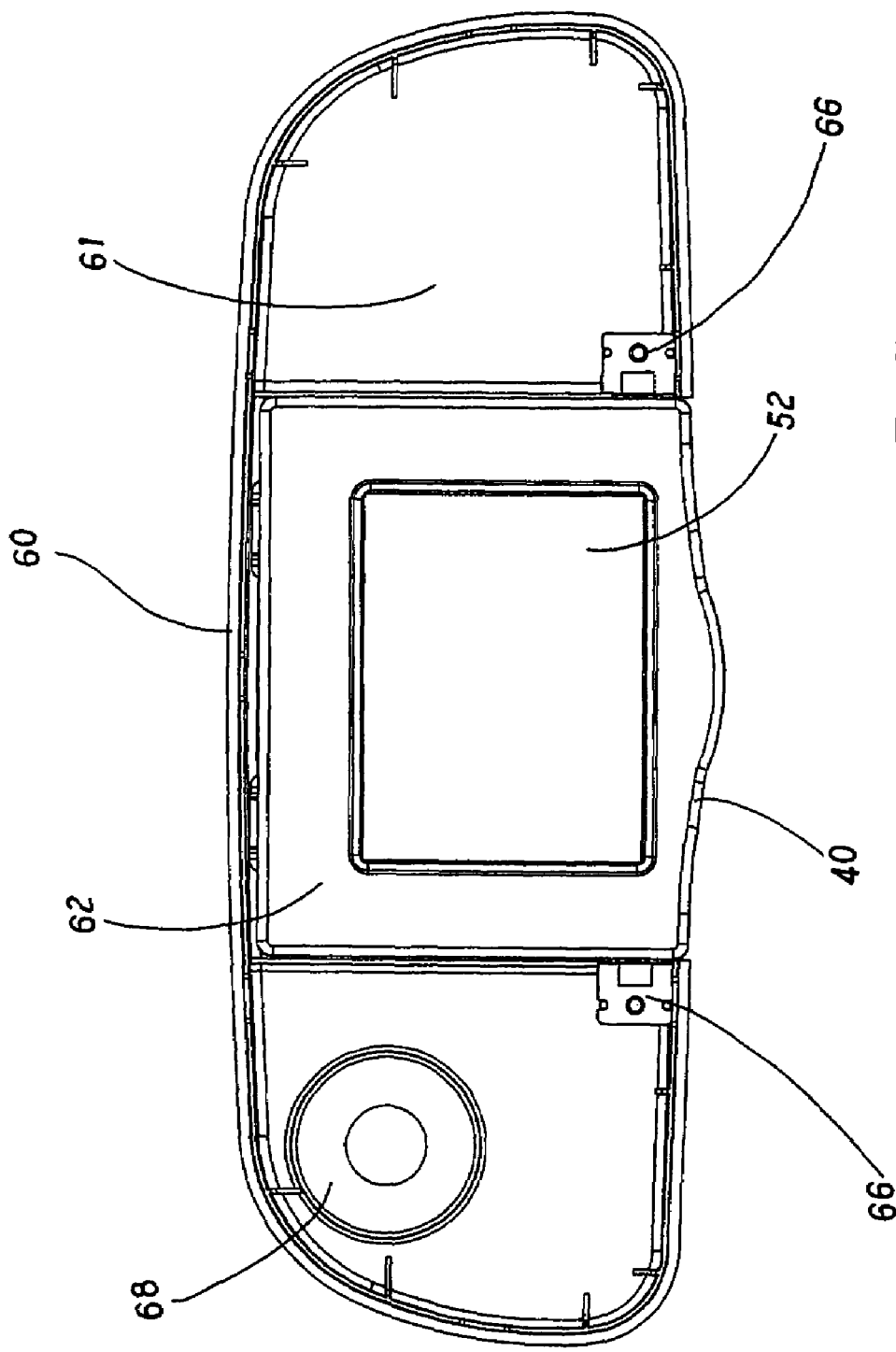
FIG. 7 is a front cross-sectional view of the automobile rearview mirror in FIG. 1 wherein the display unit is hidden.
Figure 8:
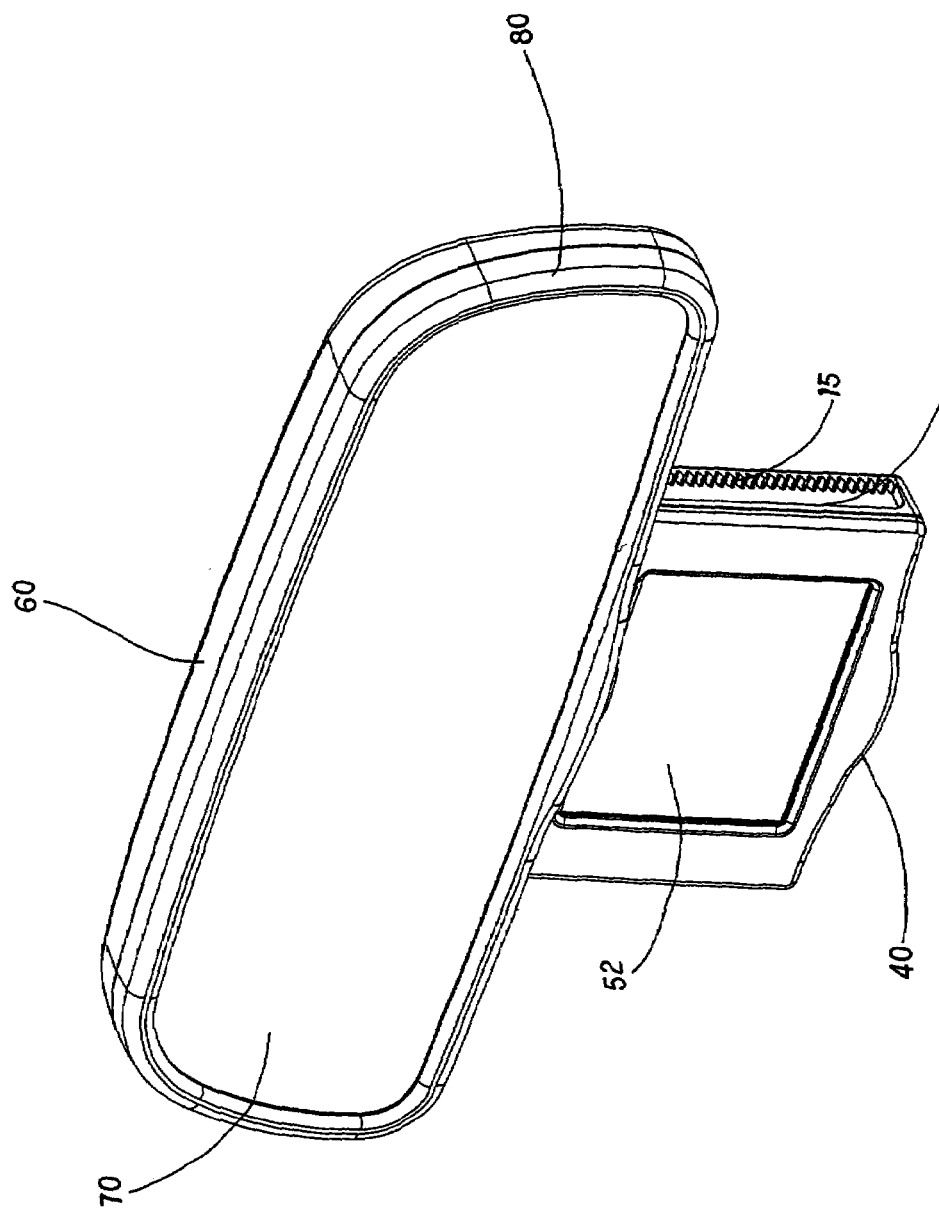
FIG. 8 is a perspective view of the automobile rearview mirror in FIG. 1 wherein the display unit is pulled out.
Figure 9:
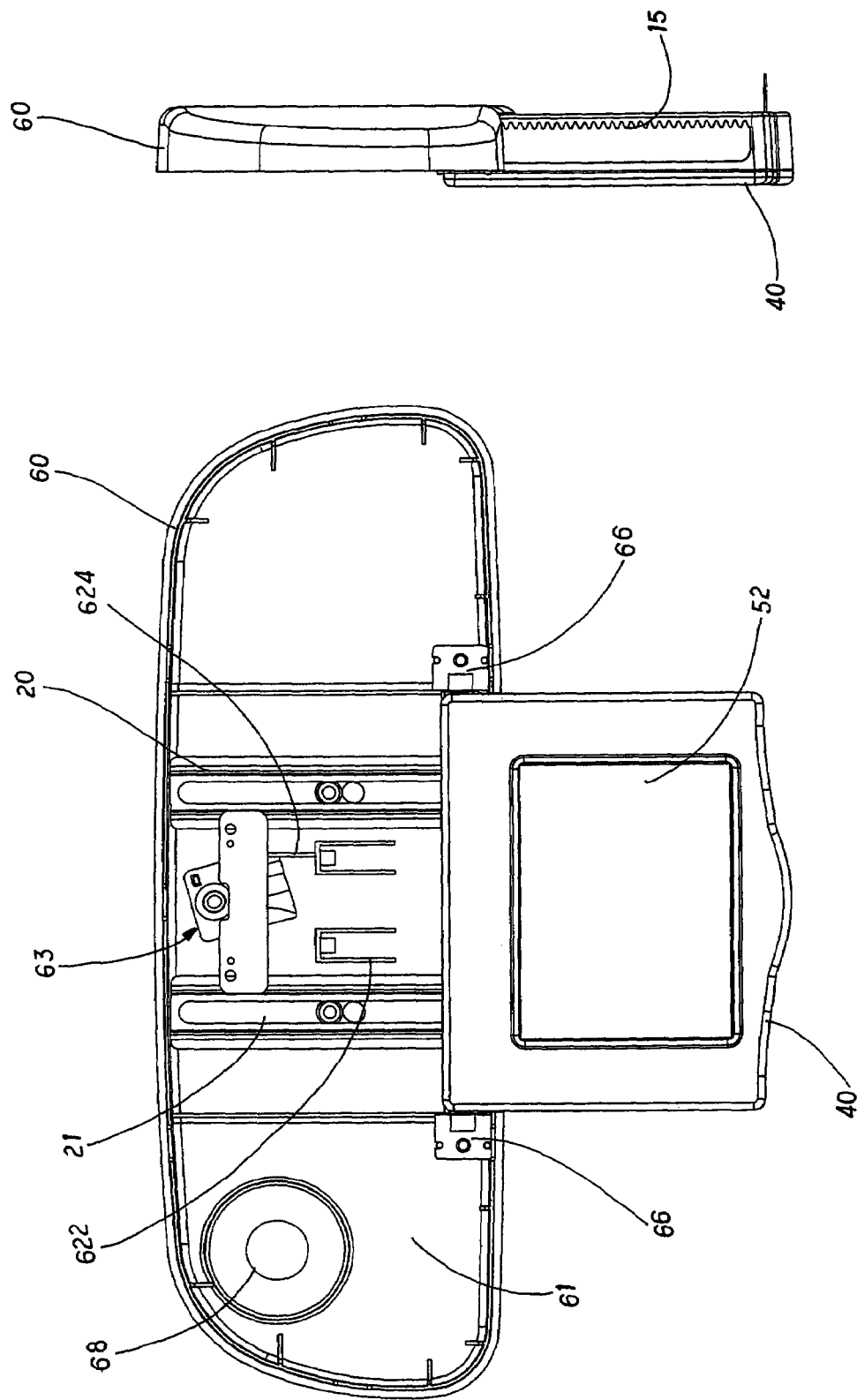
FIG. 9 shows a front cross-sectional view and a lateral view of the automobile rearview mirror in FIG. 1 wherein the display unit is pulled out.

Referring to FIGS. 1, 6 and 7, an automobile rearview mirror with an LCD display of the present invention is mounted on a conventional rearview mirror 1. When the display unit 50 is not used, the combined structure of the mount 10, the display unit 50 and the front panel 40 is hidden between the mirror 70 and rear shell 60 of the front frame 80, resembling a regular rearview mirror. Therefore, the car driver can use its mirror 70 to see the situation behind the car. Further, referring to FIGS. 1, 8 and 9, when the driver wants to see the LCD screen 52, he slightly pushes the mount 10 upward to loose the release 131 on the rear wall 12 of the mount 10 so that it will be ejected from the locking slot 634 into the outward guiding channel 633. Driven by the compressed springs 30, the release 131 will continue to be ejected along the outward guiding channel 633 and then out of the openings 621 and 81, till the slide element 64 on the rear shell 60 is stopped by the top end of the slide groove 21 of the rail sector 20. Thereby, the display unit 50 is fully ejected for displaying information on its LED screen 52, which can be the images sent from a car backing camera, GPS information, multimedia broadcasting, etc. Referring to FIG. 10, the release 131 can be further pulled downward so that it can be departed from the locking piece 63. Besides the rail sector 20 and the slide element 64 that facilitate the relative slide motion between the mount 10 and the rear shell 60, there are two gear sectors 15 on the mount 10 and two corresponding oil-pressure wheel 66 on the rear shell 60 to assure a smooth slide motion. By the same token, when the driver wants to hind the display unit 50, the combined structure of the mount 10, the display unit 50 and the front panel 40 is pushed upward so that the slide guide structure and the gear structure between the mount 10 and the rear shell 60 are engaged again. The release 131 will slide along the inward guiding channel 632 through the entrance 635, eventually locked within the locking slot 634. Thereby, the mount 10 will be secured by the engagement between the release 131 and the locking piece 63. Therefore, the display unit 50 will be hidden in the main body of the automobile rearview mirror.

In summary, the present invention has the following advantages.

1. The springs installed between the mount 10 and the rear shell 60 are for storing energy when they are compressed by the hidden display unit 50, whereby when the mount 10 is loosen from the locking piece 63 the combined structure of the display unit 50, the front panel 40 and the mount 10 will be ejected from the mirror automatically.

2. There are at least a rail sector 20 and a slide element 64 between the mount 10 and the rear shell 60, whereby the slide motion of the display unit 50 will be smooth and precise.

3. There are gear sectors and corresponding oil-pressure gear wheels 66 for providing suitable damping against the sliding display unit 50 so that its motion can be stabilized.

4. There are a release 131 and a locking piece 63 between the mount 10 and the rear shell 60, whereby when the mount 10 is hidden within the mirror it will be stably retained. Further, when the mount 10 is pushed upward the locking piece 63 will be released.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An automobile rearview mirror with a liquid crystal display (LCD), comprising:

a mount having a front wall and a rear wall, said rear wall further including at least a retaining portion for a rail sector, a spring retaining slot and a release, each of two lateral sides of said rear wall further including a gear sector;

at least one rail sector mounted on said retaining portion of said mount;

at least one spring confined in said spring retaining slot, a bottom end of said spring being stopped by said at least one spring retaining slot;

a front panel located in the front of said mount;

a display unit disposed between said mount and said front panel;

a rear shell located behind said mount having at least one slide element slidably engaging said at least one rail sector on said rear wall of said mount and at least a spring frame slot for fixing a top end of said at least one spring, whereby said mount will experience a spring restoring force, two lateral sides of a front wall of said rear shell being provided with oil-pressure gear wheels for engaging the corresponding gear sectors mounted on said mount so as to provide damping against a sliding motion of said mount; a predetermined location on said front wall of said rear shell being provided with a locking piece for retaining said release of said mount;

a mirror retained in front of said front panel; and a front frame encircling said rear shell, whereby said mount, said mirror and said front panel will be confined between said front frame and said rear shell.

2. The automobile rearview mirror with a liquid crystal display (LCD) of claim 1 wherein each of two lateral sides of said retaining portion is provided with an elongated retaining portion for confining said at least one rail sector.

3. The automobile rearview mirror with a liquid crystal display (LCD) of claim 1 wherein said at least one rail sector has an elongated slide groove for slidably confining said at least one slide element, and wherein said slide element is a pulley.

4. The automobile rearview mirror with a liquid crystal display (LCD) of claim 1 wherein said mount includes two springs, said springs are stopped at top ends and bottom ends respectively, by two spring retaining slots on said rear wall of said mount and two corresponding spring frame slots on said front wall of said rear shell.

5. The automobile rearview mirror with a liquid crystal display (LCD) display of claim 1 wherein said locking piece further comprises a main body pivotally attached to a predetermined position on said front wall of said rear shell and a torsional spring disposed between said main body and said pivotal position on said front wall of said rear shell, tilting said main body to a predetermined direction to lean against a stop wall at a predetermined location on said front wall; said main body being further provided with a depressed inward guiding channel and an outward guiding channel both with non-uniform depths; said main body further including a locking slot connecting said inward and outward guiding channels; a bottom side of said main body being provided with an entrance to said inward guiding channel and an exit at the end of said outward guiding channel, whereby said release of said mount will be guided to enter said inward guiding channel and locked in said locking slot; said release being departed from said locking slot when said mount is pushed upward and sliding along said outward guiding channel and being ejected from said exit.

* * * * *